(12) United States Patent
Suciu et al.

(10) Patent No.: US 11,118,481 B2
(45) Date of Patent: Sep. 14, 2021

(54) CERAMIC MATRIX COMPOSITE TURBINE EXHAUST ASSEMBLY FOR A GAS TURBINE ENGINE

(71) Applicant: United Technologies Corporation, Farmington, CT (US)

(72) Inventors: Gabriel L. Suciu, Glastonbury, CT (US); Brian Merry, Andover, CT (US); Ioannis Alvanos, West Springfield, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 772 days.

(21) Appl. No.: 15/424,930

(22) Filed: Feb. 6, 2017

(65) Prior Publication Data
US 2018/0223693 A1    Aug. 9, 2018

(51) Int. Cl.
*F01D 25/30* (2006.01)
*F02K 1/04* (2006.01)
(Continued)

(52) U.S. Cl.
CPC ............... *F01D 25/30* (2013.01); *F02K 1/04* (2013.01); *F02K 1/386* (2013.01); *F02K 1/48* (2013.01);
(Continued)

(58) Field of Classification Search
CPC ... F02K 1/386; F02K 1/48; F02K 1/46; F02K 1/04; F02K 3/06; F05D 2300/6033; F01D 25/30
See application file for complete search history.

(56) References Cited

U.S. PATENT DOCUMENTS 2,938,336 A    5/1960    Peterson
4,117,671 A *  10/1978   Neal ...................... F02K 1/386
                                                  239/127.3
(Continued)

FOREIGN PATENT DOCUMENTS

EP    1873385    1/2008
FR    2699227    6/1994
(Continued)

OTHER PUBLICATIONS

Extended European Search Report for European Patent Application No. 18155402.3 completed Jun. 12, 2018.
(Continued)

*Primary Examiner* — Thomas P Burke
(74) *Attorney, Agent, or Firm* — Carlson, Gaskey & Olds, P.C.

(57) ABSTRACT

A turbine exhaust assembly for a gas turbine engine according to an example of the present disclosure includes, among other things, a turbine exhaust case comprised of CMC material and attachable to a turbine case, a tail cone comprised of CMC material that has a leading edge and a trailing edge, and an exhaust mixer comprised of CMC material and coupled to the turbine exhaust case. The exhaust mixer has a plurality of lobes arranged about the tail cone to define an exhaust flow path. A plurality of struts extend from the tail cone to support the exhaust mixer at a location aft of the leading edge of the tail cone. A method of assembling a propulsion system is also disclosed.

5 Claims, 5 Drawing Sheets

(51) Int. Cl.
*F02K 3/06* (2006.01)
*F02K 1/48* (2006.01)
*F02K 1/38* (2006.01)
*F01D 9/02* (2006.01)
*F02C 3/04* (2006.01)

(52) U.S. Cl.
CPC .................. *F02K 3/06* (2013.01); *F01D 9/02* (2013.01); *F02C 3/04* (2013.01); *F05D 2240/14* (2013.01); *F05D 2260/96* (2013.01); *F05D 2300/6033* (2013.01); *Y02T 50/60* (2013.01)

(56) References Cited

U.S. PATENT DOCUMENTS

| | | | | |
|---|---|---|---|---|
| 4,147,029 | A | * | 4/1979 | Sargisson ................ F02C 7/042 137/15.1 |
| 4,548,034 | A | * | 10/1985 | Maguire ................ F02K 1/386 181/220 |
| 4,813,230 | A | | 3/1989 | Braithwaite |
| 6,648,597 | B1 | | 11/2003 | Widrig et al. |
| 7,249,462 | B2 | | 7/2007 | Aumont et al. |
| RE39,972 | E | | 1/2008 | Royalty |
| 7,677,026 | B2 | | 3/2010 | Conete et al. |
| 7,805,925 | B2 | | 10/2010 | Durocher et al. |
| 7,866,162 | B2 | | 1/2011 | Blanchard et al. |
| 8,262,345 | B2 | | 9/2012 | Andrew |
| 8,584,356 | B2 | | 11/2013 | Philippe et al. |
| 2004/0253096 | A1 | | 12/2004 | Legg |
| 2006/0010852 | A1 | * | 1/2006 | Gekht ................ B23K 15/0093 60/262 |
| 2008/0041033 | A1 | * | 2/2008 | Durocher ................ F02K 1/04 60/226.1 |
| 2008/0092514 | A1 | | 4/2008 | Suciu et al. |
| 2009/0090096 | A1 | * | 4/2009 | Sheridan ................ F02C 7/36 60/226.3 |
| 2009/0092480 | A1 | * | 4/2009 | Kupratis ................ F02K 1/085 415/144 |
| 2011/0036068 | A1 | * | 2/2011 | Lefebvre ................ F01D 9/04 60/262 |
| 2012/0279631 | A1 | | 11/2012 | Mizokami et al. |
| 2012/0297791 | A1 | * | 11/2012 | Suciu ................ F01D 9/041 60/796 |
| 2015/0075176 | A1 | | 3/2015 | Ruthemeyer et al. |
| 2015/0107225 | A1 | * | 4/2015 | Dindar ................ F02K 1/48 60/262 |
| 2015/0337761 | A1 | * | 11/2015 | Marini ................ F01D 9/041 415/144 |
| 2016/0160690 | A1 | | 6/2016 | Sokhey |

FOREIGN PATENT DOCUMENTS

| | | |
|---|---|---|
| FR | 2949820 | 3/2011 |
| JP | 2000247745 | 9/2000 |
| WO | 2006007686 | 1/2006 |
| WO | 2006060006 | 6/2006 |
| WO | 2009131793 | 10/2009 |
| WO | 2010026354 | 3/2010 |

OTHER PUBLICATIONS

Opposition for European Patent No. 2570606. Patent Holder United Technologies Corporation. Challenger Safran Aircraft Engines. Dated Aug. 2, 2016. p. 1-17.

Opposition for European Patent No. 2570606. Patent Holder United Technologies Corporation. Challenger Safran Aircraft Engines. Dated Aug. 2, 2016. p. 1-17. (English Translation).

European Search Report for European Patent Application No. 12169232.1 completed on Aug. 16, 2013.

Safran Ceramic. Specialist in advanced ceramic materials. Retreived Dec. 15, 2016 from: http://www.safran-group.com/company/safran-ceramics.

* cited by examiner

CERAMIC MATRIX COMPOSITE TURBINE EXHAUST ASSEMBLY FOR A GAS TURBINE ENGINE

BACKGROUND

The present disclosure relates to a gas turbine engine, and more particularly to an exhaust mixer comprising a ceramic matrix composite (CMC) material.

A gas turbine engine can include a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Some gas turbine engines are provided with a nacelle assembly that includes an exhaust mixer for combining turbine exhaust with bypass airflow to reduce noise emissions.

SUMMARY

A turbine exhaust assembly for a gas turbine engine according to an example of the present disclosure includes a turbine exhaust case comprised of CMC material and attachable to a turbine case, a tail cone comprised of CMC material that has a leading edge and a trailing edge, and an exhaust mixer comprised of CMC material and coupled to the turbine exhaust case. The exhaust mixer has a plurality of lobes arranged about the tail cone to define an exhaust flow path, and a plurality of struts that extend from the tail cone to support the exhaust mixer at a location aft of the leading edge of the tail cone.

In a further embodiment of any of the foregoing embodiments, the turbine exhaust case defines an outer peripheral surface configured to guide bypass flow and an inner peripheral surface bounding an exhaust flow path.

In a further embodiment of any of the foregoing embodiments, each of the plurality of struts comprises CMC material.

In a further embodiment of any of the foregoing embodiments, each of the plurality of struts extends between the turbine exhaust case and the tail cone.

In a further embodiment of any of the foregoing embodiments, each of the plurality of struts extends between the mixer and the tail cone.

In a further embodiment of any of the foregoing embodiments, each of the plurality of struts defines a concave shaped surface which forms a pressure side and defines a convex shaped surface which forms a suction side relative to incoming flow.

In a further embodiment of any of the foregoing embodiments, the turbine exhaust case and the tail cone are integrally formed with the plurality of struts.

In a further embodiment of any of the foregoing embodiments, the turbine exhaust case and the tail cone are formed as a pair of annular hoop rings, and each of the plurality of struts are bonded between the turbine exhaust case and the tail cone.

A propulsion system according to an example of the present disclosure includes a fan section that has a fan nacelle arranged at least partially about a fan, and a core cowling arranged at least partially about a compressor section and a turbine section. The turbine section is configured to drive the fan section and the compressor section. The fan nacelle and the core cowling are arranged about an engine axis to define a bypass flow path. The turbine exhaust assembly has a turbine exhaust case comprised of CMC material and attachable to a turbine case, a tail cone comprised of CMC material, and an exhaust mixer comprised of CMC material and coupled to the turbine exhaust case. The exhaust mixer includes a plurality of lobes arranged about the tail cone to define an exhaust flow path. A plurality of struts are comprised of CMC material and extend from the tail cone to support the exhaust mixer.

In a further embodiment of any of the foregoing embodiments, the exhaust mixer defines a portion of the bypass flow path.

In a further embodiment of any of the foregoing embodiments, the fan is configured to deliver a portion of air into the compressor section, and a portion of air into a bypass duct defining the bypass flow path. A bypass ratio, which is defined as a volume of air passing to the bypass duct compared to a volume of air passing into the compressor section, is less than or equal to 8.

In a further embodiment of any of the foregoing embodiments, the turbine exhaust case and the tail cone are integrally formed with the plurality of struts.

In a further embodiment of any of the foregoing embodiments, the turbine case comprises CMC material.

In a further embodiment of any of the foregoing embodiments, each of the plurality of struts is positioned forward of the exhaust mixer relative to the engine axis.

In a further embodiment of any of the foregoing embodiments, each of the plurality of struts is positioned aft of the turbine exhaust case relative to the engine axis.

In a further embodiment of any of the foregoing embodiments, the turbine exhaust case is mounted to the turbine case at a flange such that the tail cone is axially spaced apart from the turbine case relative to the engine axis.

A method of assembling a propulsion system according to an example of the present disclosure includes providing a turbine exhaust assembly that has a turbine exhaust case comprised of CMC material, a tail cone comprised of CMC material, and an exhaust mixer comprised of CMC material and coupled to the turbine exhaust case. The exhaust mixer has a plurality of lobes arranged about the tail cone to define an exhaust flow path, and a plurality of struts comprised of CMC material that extends from the tail cone to support the exhaust mixer. The method includes mounting the turbine exhaust assembly to a turbine case.

A further embodiment of any of the foregoing embodiments includes integrally forming the turbine exhaust case and the tail cone with the plurality of struts.

A further embodiment of any of the foregoing embodiments includes forming the turbine exhaust case and the tail cone as a pair of annular hoop rings, bonding each of the plurality of struts between the turbine exhaust case and the tail cone, and coupling the turbine exhaust case to the turbine case such that the tail cone is axially spaced apart from the turbine case.

A further embodiment of any of the foregoing embodiments includes arranging the turbine exhaust assembly relative to a fan nacelle such that the exhaust mixer defines a portion of a bypass flow path downstream of a fan.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
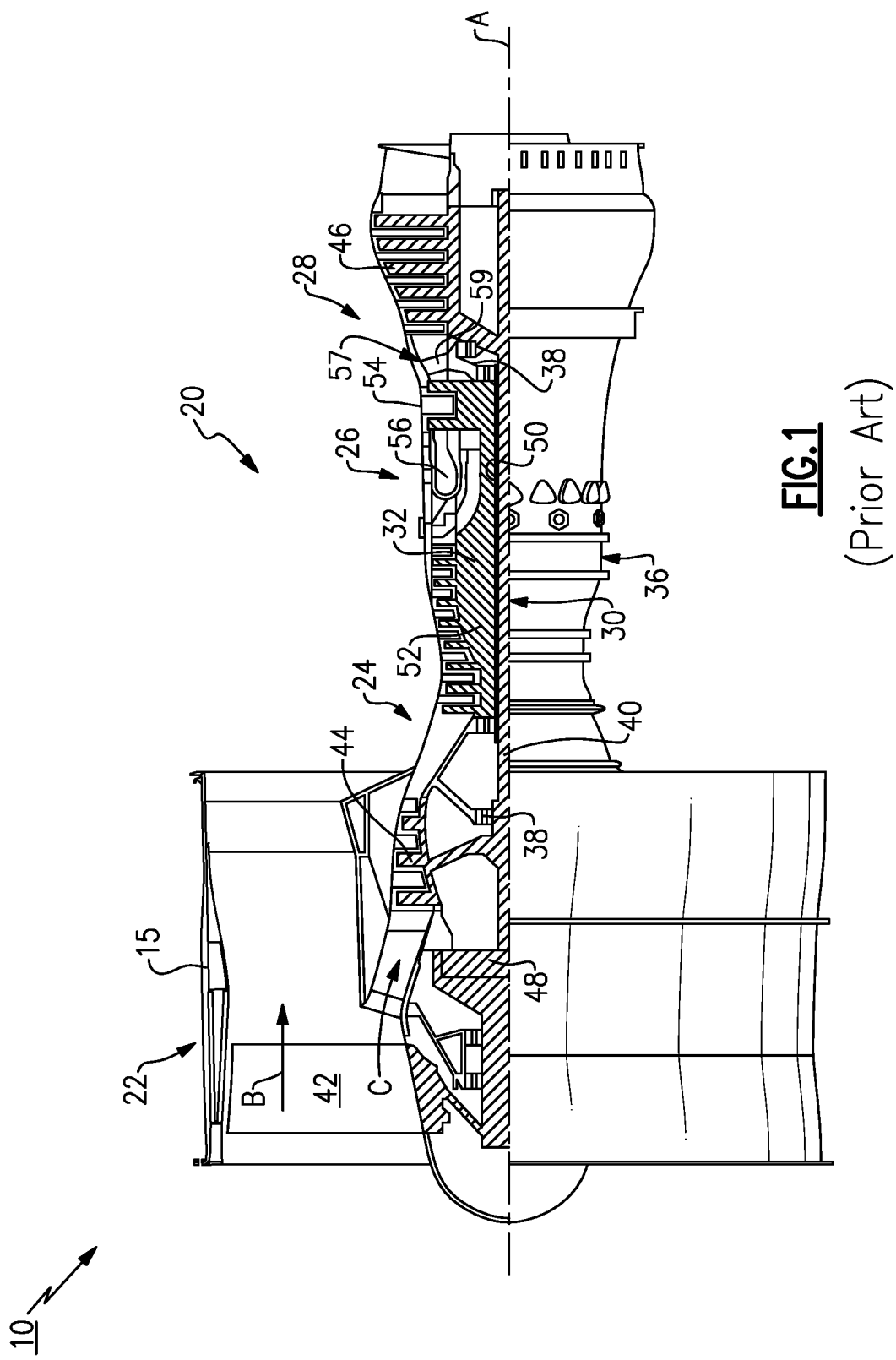
FIG. 1 shows a schematic view a gas turbine engine along an engine longitudinal axis.
Figure 2:
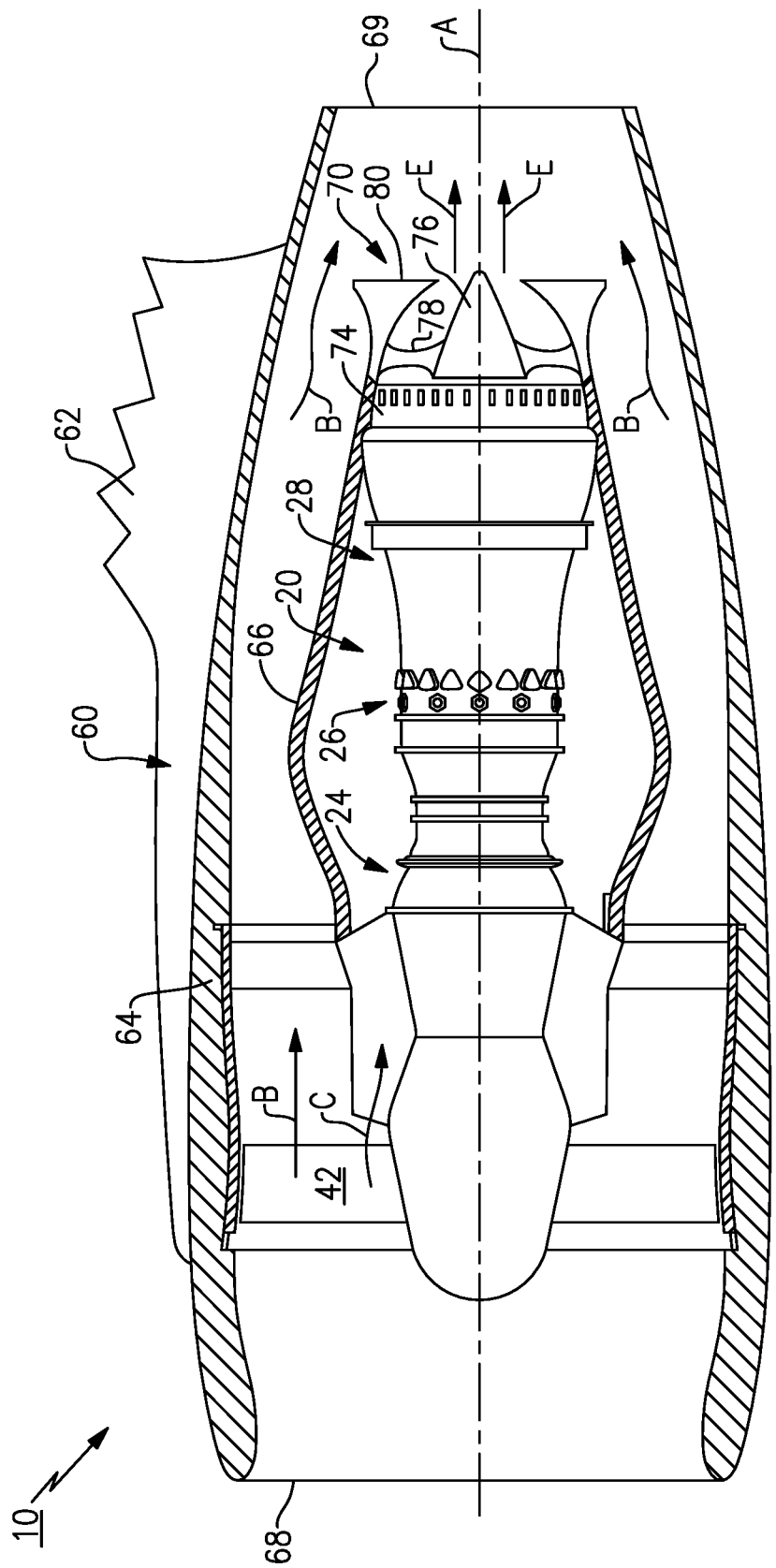
FIG. 2 is a side view of a nacelle assembly for a propulsion system.

A propulsion system 10 includes a gas turbine engine 20 (FIG. 1), a nacelle assembly 60 for guiding airflow (FIG. 2), and a pylon 62 mountable to an aircraft structure such as an aircraft wing or fuselage (FIG. 2). In this disclosure, like reference numerals designate like elements where appropriate and reference numerals with the addition of one-hundred or multiples thereof designate modified elements that are understood to incorporate the same features and benefits of the corresponding original elements.

FIG. 1 schematically illustrates the gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{\wedge}0.5$. The "Low corrected fan tip speed" as disclosed herein according to one non-limiting embodiment is less than about 1150 ft/second.

With reference to FIG. 2, the gas turbine engine 20 is mounted at least partially within nacelle assembly 60. The nacelle assembly 60 includes a fan nacelle 64 and a core cowling 66. The fan nacelle 64 extends along the engine axis A between a nacelle inlet 68 and a nacelle outlet 69. The core cowling 66 is arranged at least partially about the compressor section 24 and the turbine section 28. The fan nacelle 64 and the core cowling 66 are arranged about the engine axis A to define the bypass flow path B. In the illustrated embodiment, the fan nacelle 64 extends aft of the core cowling 66 relative to the engine axis A to provide a mixed flow nacelle arrangement. It should be understood that although a particular component arrangement is disclosed in the illustrated embodiment, various pylon structures and nacelle assemblies will benefit from the teachings herein.

A turbine exhaust assembly 70 extends from, and is coupled to, the core cowling 66 at a location aft of the turbine section 28. The turbine exhaust assembly 70 is configured such that a combination of bypass flow from the bypass flow path B and core exhaust flow discharged from the core airflow path C to an exhaust flow path E are mixed together and discharged from the nacelle outlet 69 to produce thrust.

Figure 3:
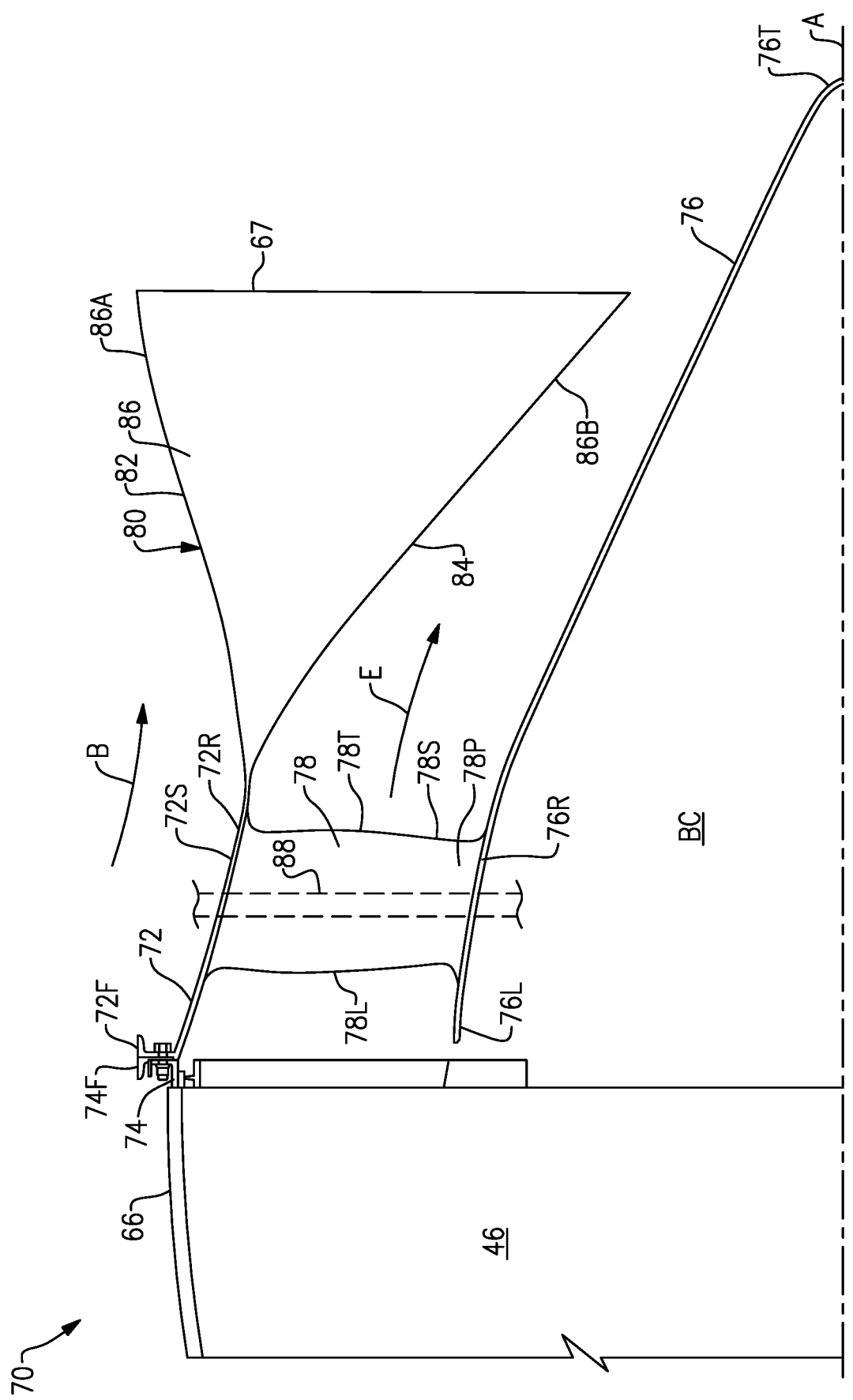
FIG. 3 is a schematic cross-section of a turbine exhaust assembly according to a first embodiment.

Referring to FIG. 3, the turbine exhaust assembly 70 includes a turbine exhaust case 72, a tail cone 76, a plurality of struts 78, and an exhaust mixer 80. The turbine exhaust case 72 is attachable to, and extends aftward from, a turbine case 74 of the turbine section 28. The turbine case 74 is arranged at least partially about one or more turbine stages of the low pressure turbine 46. It should be understood that other portions of the propulsion system 10 can benefit from the teachings herein, such as fan nacelle 64. The turbine exhaust case 72 defines an outer aerodynamic surface 72S for substantially uninterrupted flow along the core cowling 66. The tail cone 76 is a generally conical member which tapers in an aft direction from leading edge 76L towards trailing edge 76T. The tail cone 76 bounds exhaust flow path E for guiding core exhaust flow discharged from the turbine section 28.

The turbine exhaust case 72 is coupled to the turbine case 74 such that the tail cone 76 and exhaust mixer 80 are structurally supported. Flange 72F of the turbine exhaust case 72 is mounted to flange 74F of the turbine case 74. The turbine exhaust case 72 and turbine case 74 are dimensioned such that leading edge 76L of the tail cone 76 is axially spaced apart from the turbine case 74 relative to the engine axis A. This arrangement of the tail cone 76 relative to the turbine case 74 can reduce an additional attachment point and decrease weight.

The exhaust mixer 80 extends aft from the turbine exhaust case 72, with the fan nacelle 64 substantially surrounding the exhaust mixer 80 (FIG. 2). An outer peripheral surface 82 of the exhaust mixer 80 is provided with an aerodynamic surface that extends from the turbine exhaust case 72 to define a portion of the bypass flow path B. The exhaust mixer 80 defines a trailing edge 67 of the core cowling 66 relative to the engine axis A. Trailing edge 76T of the tail cone 76 extends aft of the trailing edge 67 relative to the engine axis A. An inner peripheral surface 84 of the exhaust mixer 80 bounds or otherwise defines the exhaust flow path E for guiding core exhaust flow from the turbine section 28 in a particular orientation. The exhaust mixer 80 is configured to reduce a velocity and noise emission of the core exhaust flow by mixing or otherwise combining bypass flow and core exhaust flow together.

Figure 4:
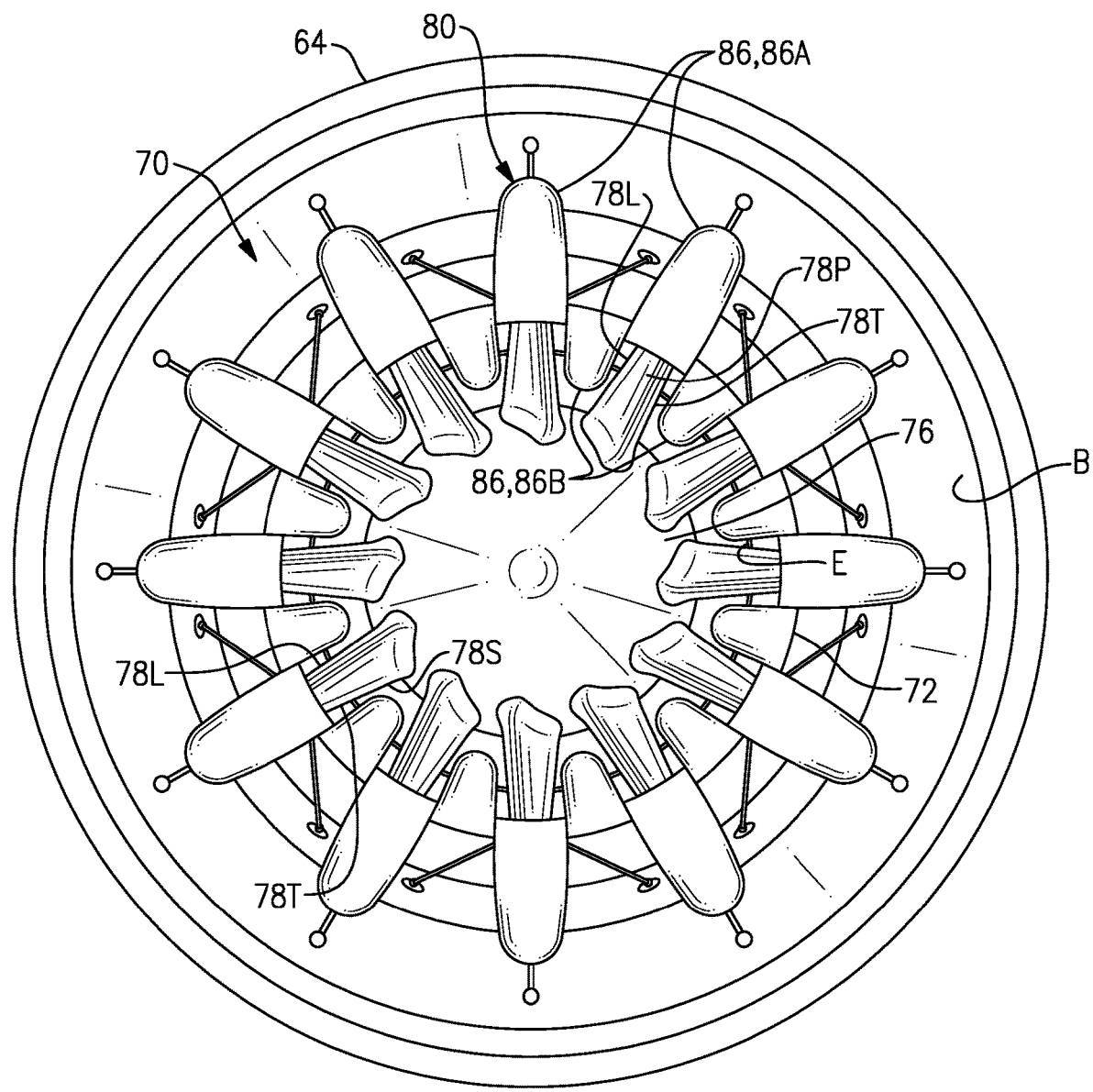
FIG. 4 is an axial view of the turbine exhaust assembly of FIG. 3.

Referring to FIG. 4, with continued reference to FIG. 3, the exhaust mixer 80 includes a plurality of lobes 86 to define a radially outer portion of the exhaust flow path E. The lobes 80 are arranged circumferentially about the tail cone 76 in a substantially uniform distribution. In other embodiments, the lobes 86 are arranged circumferentially about the tail cone 76 in a non-uniform distribution. For example, the exhaust mixer 80 can have relatively fewer lobes 86 at locations near a rear mount of the engine 20 adjacent to pylon 62. The lobes 86 include outwardly tapering portions 86A alternating with inwardly tapering portions 86B. In some embodiments, the exhaust mixer 80 includes at least four (4) lobes, such as between twelve (12) lobes (FIG. 4) and twenty (20) lobes. A geometry of the lobes 86 is defined such that a perimeter of the trailing edge 67 has a generally sinusoidal geometry. In embodiments, the turbine exhaust assembly 70 is utilized in combination with a bypass ratio less than or equal to 8 to reduce noise caused by relatively greater core airflow. It should be appreciated that engine arrangements having relatively higher bypass ratios can benefit from the teachings herein.

The struts 78 are circumferentially distributed about the engine axis A and are axially spaced apart from flange 72F and the leading edge 76L of the tail cone 76. The struts 78 extend from the tail cone 76 to support at least a portion of the exhaust mixer 80. Each of the turbine exhaust case struts 78 extends between the turbine exhaust case 72 and the tail cone 76 such that the struts 78 are positioned forward of the exhaust mixer 80 relative to the engine axis A.

The struts 78 are dimensioned as aerodynamic members to guide core exhaust flow in the exhaust flow path E and produce thrust at a particular orientation. Each strut 78 includes an airfoil body defined between a respective leading edge 78L and a trailing edge 78T. Each strut 78 includes a generally concave shaped portion which forms a pressure side 78P and a generally convex shaped portion which forms a suction side 78S relative to incoming flow. The struts 78 may be hallow to accommodate one or more service or supply lines 88 (dashed line). The lines 88 can extend through at least some of the struts 78 to provide access to, or otherwise communicate with, portions of the engine 20 such as a bearing compartment BC located within the tail cone 76.

One or more components of the turbine exhaust assembly 70 are manufactured or otherwise formed of a ceramic matrix composite (CMC) material such as S200 and SiC/SiC. In some embodiments, the turbine case 74 is manufactured of a metal superalloy INCO 718 and Waspaloy. In other embodiments, the turbine case 74 is manufactured of a CMC material including those disclosed herein.

In the illustrated embodiment of FIGS. 3 and 4, the turbine exhaust case 72, tail cone 76, and struts 78 are manufactured or otherwise comprised of CMC material such that the components are defined as a single integral CMC structure. For example, the turbine exhaust assembly 70 can be constructed of a ring-strut-ring configuration in which the struts 78 are bonded to full inner diameter and outer diameter annular hoop rings 72R, 76R. Outer diameter hoop ring 72R extends to form the exhaust mixer 80 and can be constructed of a single CMC sheet contoured to define the plurality of lobes 86. Inner diameter hoop ring 76R extends to form the downstream portion of the tail cone 76 and can be constructed of a CMC sheet. The CMC sheet can be comprised of one or more layers arranged at the same or different orientations. The CMC sheet can be reinforced with one or more layers of a metal alloy to increase rigidity. In another embodiment, the components of the turbine exhaust assembly 70 are formed of one or more layers of CMC material deposited on a work piece corresponding to a geometry of the turbine exhaust assembly 70. The turbine exhaust assembly 70 comprised of CMC material reduces overall weight of the propulsion system 10.

Figure 5:
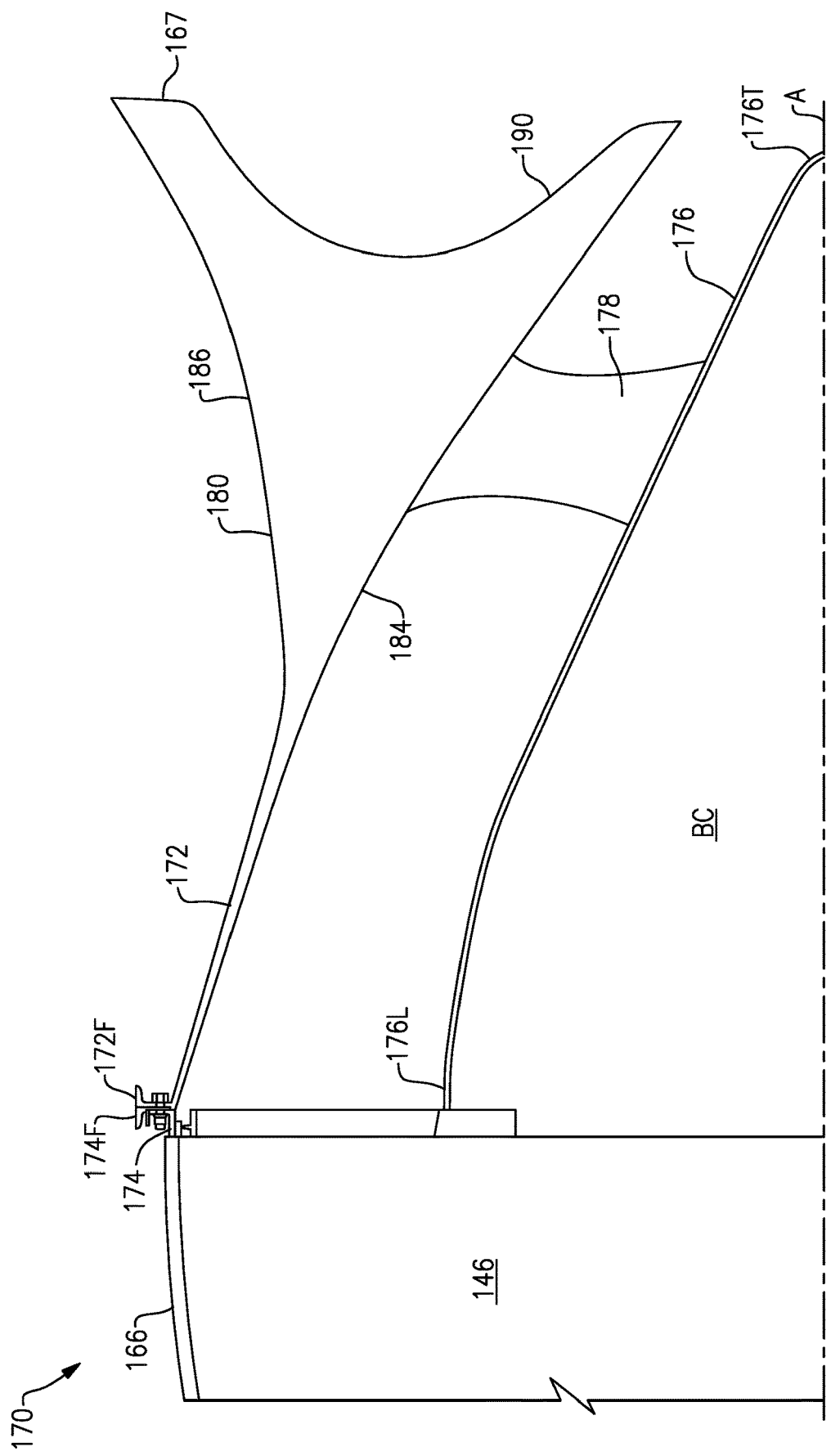
FIG. 5 is a schematic cross-section of a turbine exhaust assembly according to a second embodiment.

FIG. 5 illustrates a schematic cross-section of a turbine exhaust assembly 170 according to a second embodiment. A plurality of struts 178 extend radially between tail cone 176 and an inner peripheral surface 184 of exhaust mixer 180. Struts 178 are positioned aft of the turbine exhaust case 172 relative to the engine axis A.

Exhaust mixer 180 can be dimensioned such that trailing edge 167 extends aft of the trailing edge 176T of the tail cone 176 relative to the engine axis A. In another embodiment, trailing edge 167 is substantially axially aligned with the trailing edge 176T of the tail cone 176. Lobes 186 can be contoured with one or more recesses 190 at trailing edge 167 to augment mixing of core exhaust flow and bypass flow and further reduce noise emissions.

The tail cone 176 is fabricated such that a leading edge 176L can be mechanically coupled to turbine case 174 or another portion of the low pressure turbine 146. In some embodiments, the tail cone 176 provides structural support to transfer loads from one or more portions of the engine 20, such as a bearing compartment BC within the tail cone 176 or a rear engine mount for attaching the engine 20 to the pylon 62 (FIG. 2).

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

While this invention has been disclosed with reference to one embodiment, it should be understood that certain modifications would come within the scope of this invention. For that reason, the following claims should be studied to determine the true scope and content of this invention.

What is claimed is:

1. A propulsion system comprising:
   a fan section including a fan nacelle arranged at least partially about a fan;
   a core cowling arranged at least partially about a compressor section and a turbine section, the turbine section configured to drive the fan section and the compressor section, the fan nacelle and the core cowling arranged about an engine axis to define a bypass flow path; and
   a turbine exhaust assembly comprising:
      a turbine exhaust case comprising ceramic matrix composite (CMC) material and attachable to a turbine case;
      a tail cone comprising CMC material;
      an exhaust mixer comprising CMC material and coupled to the turbine exhaust case, the exhaust mixer including a plurality of lobes arranged about the tail cone to define an exhaust flow path; and
      a plurality of struts comprising CMC material and extending from the tail cone to support the exhaust mixer, wherein the exhaust mixer defines a portion of the bypass flow path.

2. The propulsion system as recited in claim 1, wherein the fan is configured to deliver a portion of air into the compressor section, and a portion of air into a bypass duct defining the bypass flow path, and wherein a bypass ratio, which is defined as a volume of air passing to the bypass duct compared to a volume of air passing into the compressor section, is less than or equal to 8.

3. A propulsion system comprising:
   a fan section including a fan nacelle arranged at least partially about a fan;
   a core cowling arranged at least partially about a compressor section and a turbine section, the turbine section configured to drive the fan section and the compressor section, the fan nacelle and the core cowling arranged about an engine axis to define a bypass flow path; and
   a turbine exhaust assembly comprising:
      a turbine exhaust case comprising ceramic matrix composite (CMC) material and attachable to a turbine case;
      a tail cone comprising CMC material;
      an exhaust mixer comprising CMC material and coupled to the turbine exhaust case, the exhaust mixer including a plurality of lobes arranged about the tail cone to define an exhaust flow path; and
      a plurality of struts comprising CMC material and extending from the tail cone to support the exhaust mixer, wherein each of the plurality of struts extends between the exhaust mixer and the tail cone such that the plurality of struts are axially aligned with the exhaust mixer relative to the engine axis.

4. The propulsion system as recited in claim 2, wherein an outer diameter of the bypass duct surrounds the exhaust mixer such that the outer diameter of the bypass duct is axially aligned with the exhaust mixer relative to the engine axis.

5. The propulsion system as recited in claim 4, wherein each of the plurality of struts extends between the exhaust mixer and the tail cone such that the plurality of struts are axially aligned with the exhaust mixer relative to the engine axis.

* * * * *